US012757066B1

(12) United States Patent
Akman et al.

(10) Patent No.: US 12,757,066 B1
(45) Date of Patent: Oct. 6, 2026

(54) RADIO ACCESS NETWORK NODE CONFIGURATION

(71) Applicant: Juniper Networks, Inc., Sunnyvale, CA (US)

(72) Inventors: Arda Akman, San Ramon, CA (US); Burcu Sahin, Ankara (TR)

(73) Assignee: Hewlett Packard Enterprise Development LP, Spring, TX (US)

( * ) Notice: Subject to any disclaimer, the term of this patent is extended or adjusted under 35 U.S.C. 154(b) by 286 days.

(21) Appl. No.: 18/585,595

(22) Filed: Feb. 23, 2024

Related U.S. Application Data

(60) Provisional application No. 63/486,940, filed on Feb. 24, 2023.

(51) Int. Cl.
*H04W 28/02* (2009.01)
*H04W 24/10* (2009.01)

(52) U.S. Cl.
CPC ....... *H04W 28/0278* (2013.01); *H04W 24/10* (2013.01)

(58) Field of Classification Search
CPC ......... H04W 28/0278; H04W 28/0268; H04W 24/08; H04W 24/10; H04W 88/08; H04W 88/12; H04W 92/12; H04W 92/20
See application file for complete search history.

(56) References Cited

U.S. PATENT DOCUMENTS

2022/0232452 A1 7/2022 Sivaraj et al.
2022/0286840 A1 9/2022 Singh
2022/0407664 A1 12/2022 Wang et al.
2023/0055590 A1* 2/2023 Sivaraj .................... H04L 69/06
2023/0139546 A1 5/2023 Song et al.
2023/0239776 A1 7/2023 Song et al.
2023/0246724 A1 8/2023 Pateromichelakis et al.
(Continued)

FOREIGN PATENT DOCUMENTS

EP 4135300 A1 2/2023
EP 4277336 A1 11/2023
(Continued)

OTHER PUBLICATIONS

"ORAN-SC RIC Platform project; RAN Intelligent Controller (RIC); E2 application protocol (E2AP); (Release 1)", vol. 1, AT&T and Nokia, 2019, 50 pp., Retrieved from the Internet on Jul. 2, 2025 from URL: https://gerrit.o-ran-sc.org/r/gitweb?p=ric-plt/asn1-documents.git;a=blob_plain;f=e2ap/RIC-E2AP-v100.pdf;hb=refs/heads/master.

(Continued)

*Primary Examiner* — Mohamed A Kamara
(74) *Attorney, Agent, or Firm* — Shumaker & Sieffert P.A.

(57) ABSTRACT

Example techniques and systems are disclosed. An example controller for a radio access network (RAN) includes one or more processors and one or more memories coupled to the one or more processors. The one or more memories store instructions to cause the one or more processors to send, to an E2 node of the RAN, a control message of a first service model comprising first object configuration data for a type of object that is a reference attribute for a second service model. The instructions cause the one or more processors to receive, from the E2 node, a report message of the first service model comprising second object configuration data.

20 Claims, 14 Drawing Sheets

(56) References Cited

U.S. PATENT DOCUMENTS

| | | | | |
|---|---|---|---|---|
| 2023/0276253 | A1* | 8/2023 | Niemelä | H04W 16/22<br>370/329 |
| 2023/0337268 | A1* | 10/2023 | Song | H04W 16/14 |
| 2024/0121049 | A1 | 4/2024 | Jeong et al. | |
| 2024/0196376 | A1* | 6/2024 | Wang | H04W 24/02 |
| 2024/0205688 | A1* | 6/2024 | Vanjare | H04W 16/10 |
| 2025/0344092 | A1* | 11/2025 | Kozuka | H04W 24/10 |

FOREIGN PATENT DOCUMENTS

| | | | |
|---|---|---|---|
| EP | 4456624 | A1 | 10/2024 |
| EP | 4460080 | A1 | 11/2024 |
| EP | 4546860 | A1 | 4/2025 |
| GB | 2610308 | A | 3/2023 |
| ID | P202407365 | A | 9/2024 |
| KR | 20230120049 | A | 8/2023 |
| WO | 2023014087 | A1 | 2/2023 |
| WO | 2023027467 | A1 | 3/2023 |
| WO | 2023027531 | A1 | 3/2023 |
| WO | 2023248842 | A1 | 12/2023 |

OTHER PUBLICATIONS

Dryjanski, "O-RAN Near-Real-Time RIC", Rimedo Labs, Apr. 13, 2021, 7 pp.

Kumar, "Near-RT RIC Architecture", Blog, Aug. 17, 2021, 8 pp.

Office Action from U.S. Appl. No. 18/585,632 dated Jun. 2, 2025, 21 pp.

Parallel Wireless, "Introduction to O-RAN Philosophy", Apr. 14, 2021, 4 pp., URL: https://www.parallelwireless.com/blog/introduction-to-o-ran-philosophy.

Poles et al., "Understanding O-RAN: Architecture, Interfaces, Algorithms, Security, and Research Challenges", IEEE Communications Surveys & Tutorials, vol. 25, No. 2, Jan. 23, 2023, pp. 1376-1411.

Qualcomm Inc., "3GPP TSG-RAN WG2 Meeting #111e", Qualcomm Inc., Aug. 17, 2020, 7 pp.

Notice of Allowance from U.S. Appl. No. 18/585,632 dated Nov. 4, 2025, 7 pp.

Response to Office Action dated Jun. 2, 2025 from U.S. Appl. No. 18/585,632, filed Sep. 30, 2025, 11 pp.

3GPP, "3rd Generation Partnership Project; Technical Specification Group Services and System Aspects; Management and orchestration; 5G Network Resource Model (NRM); Stage 2 and stage 3 (Release 16)", 3GPP TS 28.541 V16.1.0, vol. 16, No. 1, 3GPP Organizational Partners, Jun. 12, 2019, 240 pp.

O-RAN Alliance, "E2 Application Protocol (E2AP)", O-RAN Work Group 3 (WG-3) Near-Real-time RAN Intelligent Controller and E2 Interface, vol. 3, O-RAN Alliance e.V, Mar. 2023, 119 pp., URL: https://orandownloadsweb.azurewebsites.net/specifications.

O-RAN Alliance, "E2 General Aspects and Principles (E2GAP)", O-RAN Work Group 3 (WG-3) Near-Real-time RAN Intelligent Controller and E2 Interface, vol. 3, O-RAN Alliance e.V, Mar. 2023, 49 pp., URL: https://orandownloadsweb.azurewebsites.net/specifications.

O-RAN Alliance, "E2 Service Model (E2SM)", O-RAN Work Group 3 (WG-3) Near-Real-time RAN Intelligent Controller and E2 Interface, vol. 3, O-RAN Alliance e.V, Nov. 16, 2022, 36 pp.

O-RAN Alliance, "E2 Service Model (E2SM), Cell Configuration and Control", O-RAN Working Group 3 Near-Real-time RAN Intelligent Controller, vol. 1, No. 1, O-RAN Alliance e.V, Oct. 2022, 60 pp., URL: https://orandownloadsweb.azurewebsites.net/specifications.

U.S. Appl. No. 18/585,625, filed Feb. 23, 2024, naming inventors Akman et al.

U.S. Appl. No. 18/585,632, filed Feb. 23, 2024, naming inventors Akman et al.

* cited by examiner

RADIO ACCESS NETWORK NODE CONFIGURATION

This application claims the benefit of U.S. Provisional Patent Application 63/486,940, filed Feb. 24, 2023, the entire content of which is incorporated herein by reference.

TECHNICAL FIELD

The disclosure relates generally to cellular networks and, more specifically, to configuring one or more nodes for a radio access network.

BACKGROUND

The complexity of cellular networks is increasing. Next-generation wireless systems are based on heterogeneous technologies utilized across multiple frequency bands. Specialized networks can be created using the Radio Access Network (RAN) of a mobile network operator combined with functions of a 5G core. For example, networks can be created and/or configured for a specific service level agreement (SLA), special use cases, or other specific requirements. Examples of such networks include private mobile networks (PMNs), industrial networks, and dedicated networks for connected vehicles. Recent developments include Multiple Input, Multiple Output (MIMO), millimeter-wave, sub-terahertz communication, network-based sensing, network slicing, and Machine-Learning (ML)-based digital signal processing (DSP).

Many conventional approaches to cellular networking adopt a black-box approach, employing monolithic, all-in-one solutions that implement each and every layer of a cellular protocol stack, from a particular vendor. Reliance on such black-box solutions has resulted in limited configurability of RANs, with equipment implementing operations that cannot be fine-tuned to support diverse system deployments and differing traffic profiles. Likewise, conventional approaches provide very limited coordination among network nodes, preventing joint optimization and control of RAN components. Similarly, the black-box approach may result in vendor lock-ins, where limited options exist for network operators to deploy and interface RAN equipment from multiple vendors. Under these conditions, optimized radio resource management and efficient spectrum utilization via real-time adaptation becomes difficult or impossible to implement.

An open RAN (O-RAN) model has been proposed in order to enhance and optimize new network systems. O-RAN makes it possible to expose data and analytics, and to enable data-driven network optimization, closed-loop control, and automation. The O-RAN specifications, available online at orandownloadsweb.azurewebsites.net/specifications, implement an open radio network on top of the 3$^{rd}$ Generation Partnership Project (3GPP) Long Term Evolution (LTE) and 3GPP New Radio (NR) RAN specifications. For example, 3GPP NR describes a 7.2 split for base stations which is extended by the O-RAN specifications. O-RAN deployments are based on disaggregated, virtualized and software-based components, connected through open and standardized interfaces, and interoperable across different vendor platforms. Disaggregation and virtualization enable flexible deployments, based on cloud-computing principles. This increases the resiliency, reconfigurability, and adaptiveness of the RAN. Open and standardized interfaces allow operators to onboard any of a variety of different equipment vendors, which potentially opens the RAN ecosystem to smaller players, and enables vendor diversity. Likewise, open interfaces and software-defined protocol stacks enable the integration of intelligent, data-driven closed-loop control for the RAN.

O-RAN has been developed to meet different deployment scenarios and differentiated industry requirements in a timely manner. These requirements include not only large bandwidth, low latency, and high security, but also efficient network construction and fast service provisioning, real-time network status awareness, fast fault diagnosis, precise traffic prediction and optimization, and system openness and reliability. It is difficult to address the foregoing needs with telecommunications technologies and architectures that utilize conventional non-O-RAN-specific models such as Operations, Administration, and Maintenance (OAM), Element Management System (EMS), and/or Fault, Configuration, Accounting, Performance and Security (FCAPS). Another example non-O-RAN-specific model is the 5G Network Resource Model (NRM), defined in 3GPP Technical Specification (TS) 28.541 V16.1.0, June, 2019, 3rd Generation Partnership Project, Technical Specification Group Services and System Aspects; Management and orchestration; 5G Network Resource Model (NRM); Stage 2 and stage 3 (Release 16) (hereinafter, “3GPP 28.541”), which is incorporated by reference herein in its entirety.

SUMMARY

In general, the disclosure describes techniques for configuring one or more nodes of a Radio Access Network (RAN) using a near real-time (RT) RAN Intelligent Controller (RIC). The RAN may be configured in accordance with Open Radio Access Network (O-RAN) standards (“O-RAN architecture”). The RAN includes one or more O-RAN Central Units (O-CUs), O-RAN Distributed Units (O-DUs), and O-RAN Radio Units (O-RUs). An O-CU node is made up of a Control Plane (CP) logical component designated as an O-CU-CP, and a User Plane (UP) logical component designated as an O-CU-UP. The RAN may include one or more O-RAN eNodeBs (O-eNBs), O-RAN gNodeBs (O-gNBs), or the like. An E2 node is a logical node terminating the E2 interface. O-CU-CPs, O-CU-UPs, O-DUs, O-eNBs, and O-gNBs are all non-limiting examples of E2 nodes.

Described herein are techniques for an E2 service model for cell configuration and control (E2SM-CCC). An example of such a service model is described in “Near-Real-time RAN Intelligent Controller; E2 Service Model (E2SM), Cell Configuration and Control,” O-RAN Working Group 3, ORAN.WG3.E2SM-CCC-R003-v01.01, Technical Specification, July 2022, which is incorporated by reference herein in its entirety.

According to one example disclosed herein, a controller is provided for a radio access network (RAN). The controller includes one or more processors; and one or more memories coupled to the one or more processors, the one or more memories storing instructions to cause the one or more processors to: send, to an E2 node of the RAN, a control message of a first service model comprising first object configuration data for a type of object that is a reference attribute for a second service model; and receive, from the E2 node, a report message of the first service model comprising second object configuration data.

According to one example disclosed herein, an E2 node of a RAN is provided. The E2 node includes one or more processors; and one or more memories coupled to the one or more processors, the one or more memories storing instructions to cause the one or more processors to: receive, from a controller of the RAN, a control message of a first service model comprising object configuration data for a type of object that is a reference attribute for second service model; and change a configuration of a cell or a node of the RAN based on the object configuration data.

According to one example disclosed herein, non-transitory computer-readable storage media includes instructions, which when executed by one or more processors, cause the one or more processors to: send, to an E2 node of the RAN, a control message of a first service model comprising first object configuration data for a type of object that is a reference attribute for a second service model; and receive, from the E2 node, a report message of the first service model comprising second object configuration data.

According to another example disclosed herein, a controller is provided for a radio access network (RAN). The controller includes one or more processors; and one or more memories coupled to the one or more processors, the one or more memories storing instructions to cause the one or more processors to: access, in the one or more memories, a simplified set of one or more configuration parameters of a first service model, each of the simplified set of one or more configuration parameters including one or more first-class attributes that do not reference any other object classes, and wherein the simplified set of one or more configuration parameters is based on a complex set of reference attributes from a second service model; and send, to an E2 node of the RAN, a control message to configure one or more components of the RAN based on the simplified set of one or more configuration parameters.

According to another example disclosed herein, an E2 node of a RAN is provided. The E2 node includes one or more processors; and one or more memories coupled to the one or more processors, the one or more memories storing instructions to cause the one or more processors to: receive, from a controller of the RAN, a control message to configure one or more components of the RAN based on a simplified set of one or more configuration parameters of a first service model, each of the simplified set of one or more configuration parameters including one or more first-class attributes that do not reference any other object classes, and wherein the simplified set of one or more configuration parameters is based on a complex set of reference attributes from a second service model; and change a configuration of the one or more components based on the control message.

According to another example disclosed herein, non-transitory computer-readable storage media includes instructions, which when executed by one or more processors, cause the one or more processors to: access, in the one or more memories, a simplified set of one or more configuration parameters of a first service model, each of the simplified set of one or more configuration parameters including one or more first-class attributes that do not reference any other object classes, and wherein the simplified set of one or more configuration parameters is based on a complex set of reference attributes from a second service model; and send, to an E2 node of the RAN, a control message to configure one or more components of the RAN based on the simplified set of one or more configuration parameters.

According to yet another example disclosed herein, a controller is provided for a radio access network (RAN). The controller includes one or more processors; and one or more memories coupled to the one or more processors, the one or more memories storing instructions to cause the one or more processors to: send, to an E2 node of the RAN, a control message comprising first object configuration data for the E2 node, wherein the first object configuration data includes a first global cell identifier that uniquely identifies a first cell or first node of the RAN to which the first object configuration data is to be applied.

According to yet another example disclosed herein, an E2 node of a RAN is provided. The E2 node includes one or more processors; and one or more memories coupled to the one or more processors, the one or more memories storing instructions to cause the one or more processors to: receive, from a controller of the RAN, a control message comprising object configuration data for the E2 node, wherein the object configuration data includes a global cell identifier that uniquely identifies a cell or node of the RAN to which the object configuration data is to be applied; and based on receiving the control message, changing a configuration of the cell or the node identified by the global cell identifier in accordance with the object configuration data.

According to yet another example disclosed herein, non-transitory computer-readable storage media includes instructions, which when executed by one or more processors, cause the one or more processors to: send, to an E2 node of the RAN, a control message comprising first object configuration data for the E2 node, wherein the first object configuration data includes a first global cell identifier that uniquely identifies a first cell or first node of the RAN to which the first object configuration data is to be applied.

The techniques may provide one or more technical advantages that realize at least one practical application. For example, the techniques in this disclosure may provide a service model for configuring one or more components of the E2 node in a radio access network (RAN) and, more particularly, in a RAN deployed according to the O-RAN framework. Moreover, the techniques in this disclosure may provide a configurable service model such that an operator may configure various settings of the RAN.

The details of one or more examples are set forth in the accompanying drawings and the description below. Other features, objects, and advantages will be apparent from the description and drawings, and from the claims.

DETAILED DESCRIPTION

Figure 1:
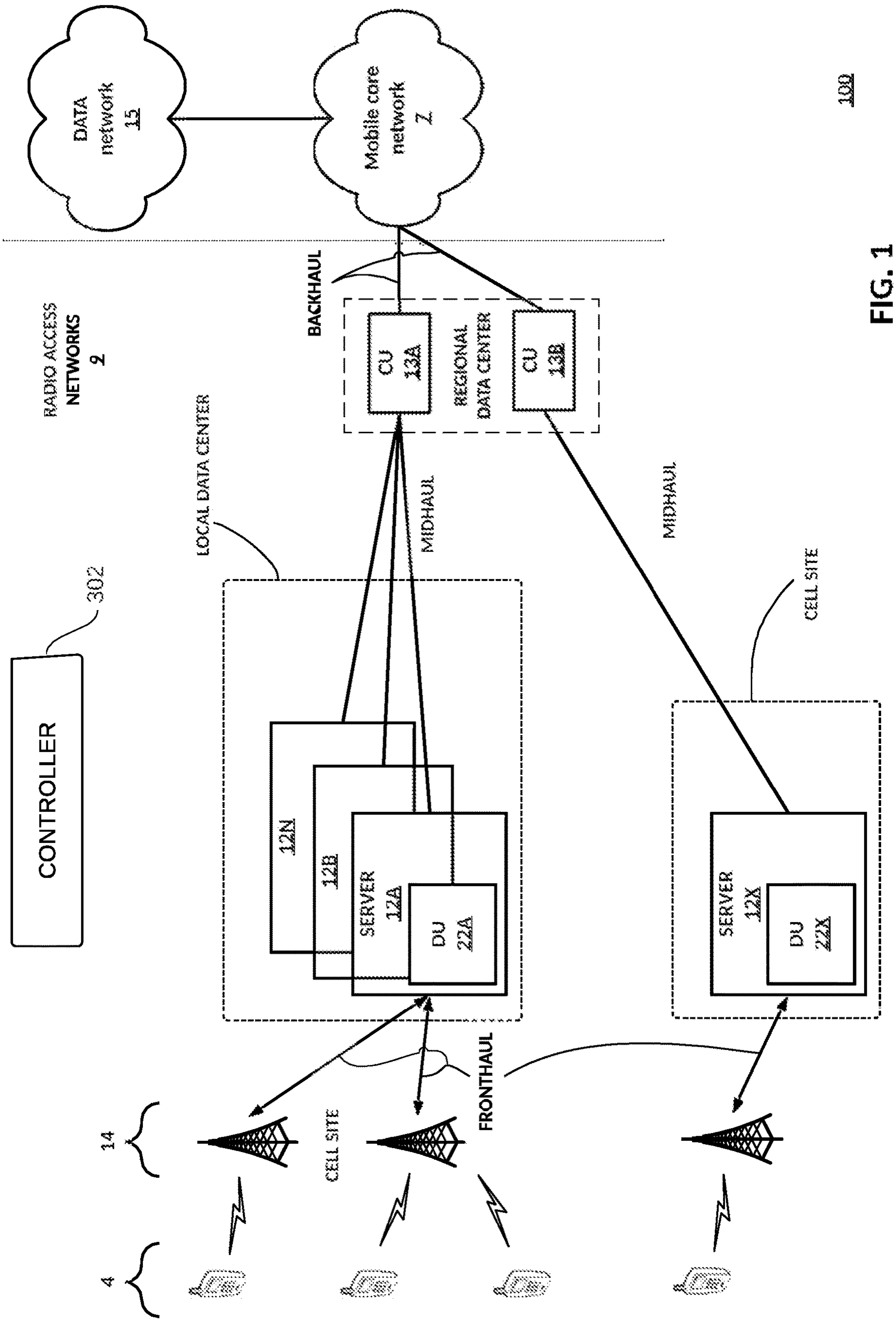
FIG. 1 is a block diagram illustrating an example mobile network system, in accordance with techniques described in this disclosure.

FIG. 1 is a block diagram illustrating an example mobile network system 100, in accordance with techniques described in this disclosure. Mobile network system 100 may be a 5G network that implements 5G standards promulgated by, e.g., the 3rd Generation Partnership Project (3GPP), the Open Radio Access Network ("O-RAN" or "ORAN") Alliance, the European Telecommunications Standards Institute (ETSI), the Internet Engineering Task Force (IETF), and/or the International Telecommunication Union (ITU).

5G networks allow for disaggregation of mobile fronthaul and midhaul networks by building the networks around cloud native principles. As a result, service providers may avoid becoming locked into particular appliance vendors and may combine effective solutions from different vendors at different layers and locations to build and provision a mobile network system. This can improve radio access networks (RANs), in particular, by making such RANs more open, resilient, and scalable, as well as less costly.

O-RAN-based networks decompose the baseband unit (BBU) found in traditional telecommunications networks into three functional units: a Radio Unit (RU), a Distributed Unit (DU), and a Central Unit (CU). Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring added flexibility to deployment—different combinations of RU, DU, and CU may be deployed at the same location, or at different locations. For example, where latency is critical, RU, DU, and CU can be placed together at the RAN edge. DUs and CUs that conform to O-RAN are often referred to as O-DUs and O-CUs, respectively. Additional data plane elements known as user plane functions (UPFs) operate in mobile core network 7 to forward traffic between the CU and data network 15. Additional control plane elements operate in mobile core network 7. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 9 and mobile core network 7. According to one example disclosed herein, a controller 302, such as a RAN Intelligent Controller (RIC), provides an open hosting platform and is responsible for controlling and optimizing one or more RAN functions. In some examples, controller 302 may incorporate artificial intelligence (AI) and/or machine learning (ML) into its decision-making functionalities. Radio access networks 9 include RUs 14 located at various cellular network sites ("cell sites"). Each RU 14 consists of an LO PHY and a RF transmitter. The LO PHY component may be implemented using specialized hardware for high-performance packet processing. Each RU 14 may be configured to communicate with one or more User Equipments (UEs) 4 over RF communication links. UEs 4 may represent smartphones, desktop computers, laptop computers, tablets, smart watches, and/or "Internet-of-Things" (IOT) devices, such as cameras, sensors, televisions, appliances, or the like.

RUs 14 connect to DUs 22A-22X (collectively, "DUs 22") via the fronthaul network. The fronthaul network connects LO PHY and HI PHY and is used by RUs 14 and DUs 22 to implement an F2 interface of 5G. DUs 22 manage radio packet transmission by the RUs 14. In some cases, such packet transmission conforms to the Common Packet Radio Interface (CPRI) and/or to the enhanced CPRI (eCPRI) standard, or to IEEE 1914.3. DUs 22 may implement the Radio Link Control (RLC), Media Access Control (MAC), and the HI PHY layer. DUs 22 are at least partially controlled by CUs 13A-13B (collectively, "CUs 13").

DUs 22 connect to CUs 13 via the midhaul network, which may be used by DUs 22 and CUs 13 to implement the F1 of 5G. CUs 13 may implement the Radio Resource Control (RRC) and Packet Data Convergence Protocol (PDCP) layers. CUs 13 connect to mobile core network 7 via a backhaul network. In some examples, the midhaul and backhaul networks may each be wide area networks (WANs).

In some embodiments of radio access networks 9 of mobile network system 100, a base station (such as a gNodeB, an eNodeB, and/or an O-RAN O-eNB) includes one of CUs 13 and one of DUs 22. A CU may support multiple DUs to implement multiple gNodeBs. One or more RUs may be supported by a single DU. Thus, for example with respect to FIG. 1, CU 13A and DU 22A and one of RUs 14 may form one eNodeB, while CU 13A and DU 22B (not shown, of server 12B) and another one of RUs 14 may form another eNodeB.

As shown in FIG. 1, any DU of DUs 22 may or may not be located at the cell site that includes the RU(s) 14 supported by the DU. For example, DU 22X is located at a cell site, while DUs 22A-22N are located at a local data center and collectively support multiple RUs 14. Mobile network system 100 may have radio access networks 9 that include many thousands of cell sites, each having one or more RUs 14*s* and optionally one or more DUs 22. Whether located at a cell site or offsite, a DU is typically within 20 km of the supported RUs. CUs 13 are shown in FIG. 1 as located at a regional data center, typically within 40 km of the supported DUs 22.

Radio access networks 9 connect to mobile core network 7 to exchange packets with data network 15. Mobile core network 7 may be a 5G core network, and data network (DN) 15 may represent, for example, one or more service provider networks and services, the Internet, 3rd party services, an IP-multimedia subsystem, or other network.

Mobile network system 100 includes multiple servers 12A-12X (collectively "servers 12") to execute DUs 22. Each of servers 12 may be a real or virtual server that hosts/executes software that implements DUs 22. Such software may include one or more applications deployed as, e.g., virtual machine or containers, to servers 12. While not shown in FIG. 1, CUs 13 may also be executed by servers 12. The combination of DUs 22, the midhaul network, CUs 13, and the backhaul network effectively implement an IP-based transport network between the radio units 14 and mobile core network 7.

Figure 2:
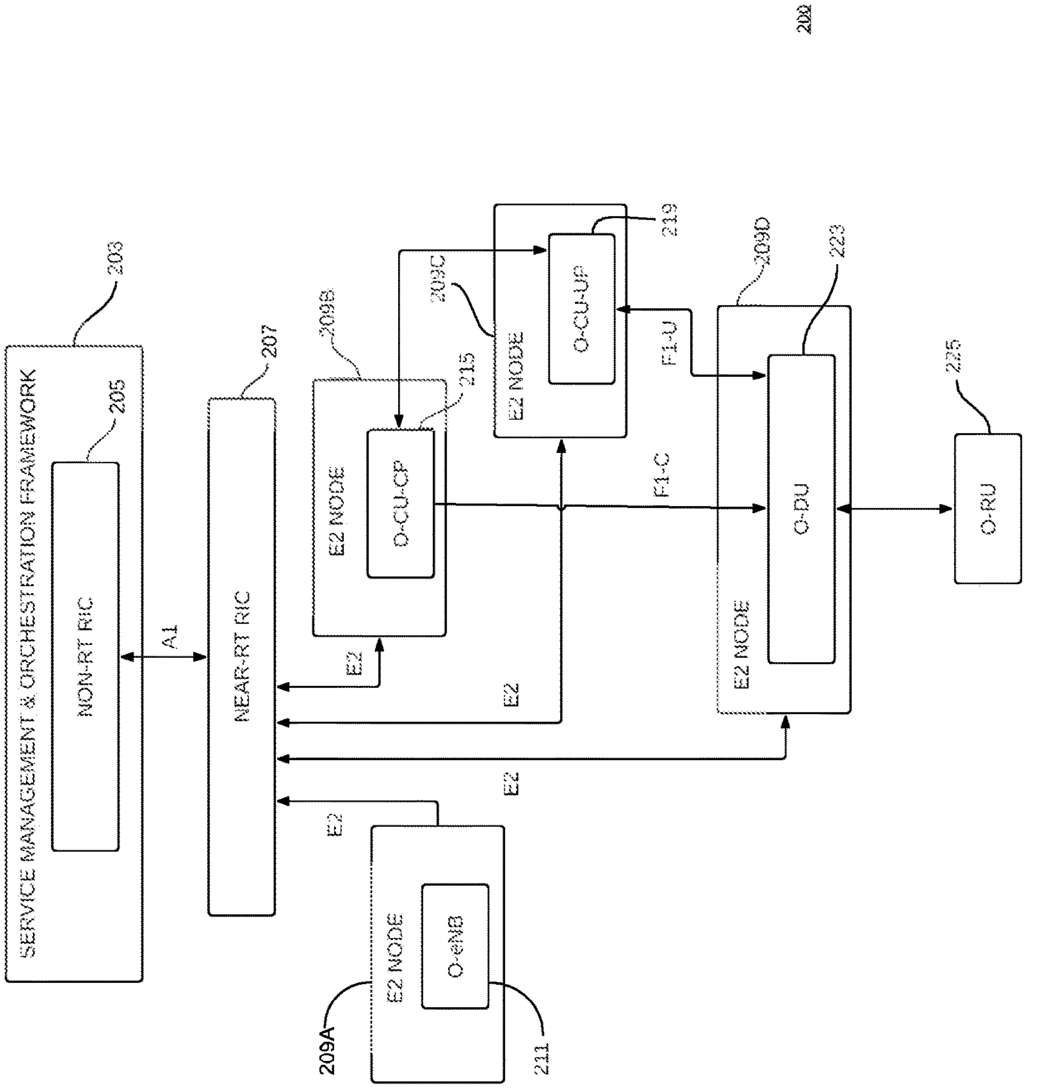
FIG. 2 is a block diagram illustrating an example of an O-RAN system, in accordance with techniques described in this disclosure.

FIG. 2 is a block diagram illustrating an example of an Open Radio Access Network (O-RAN) architecture 200 ("O-RAN 200") for a mobile network, in accordance with techniques described in this disclosure. O-RAN 200 includes a near real-time (near-RT) Radio Access Network (RAN) Intelligent Controller (RIC) 207 programmed to configure one or more E2 nodes of O-RAN 200. O-RAN 200 includes an O-RAN base station (O-eNB) 211, an O-RAN Central Unit (O-CU), a Distributed Unit (O-DU) 223, and a Radio Unit (O-RU) 225. O-CU includes a Control Plane (CP) logical component shown as an O-CU-CP 215, and a User Plane (UP) logical component shown as an O-CU-UP 219. O-RAN 200 includes E2 nodes 209A-209D (collectively, "E2 nodes 209"). For example, O-DU 223 is a logical node that is one of E2 nodes 209 terminating an E2 interface. Likewise, O-eNB 211 is a logical node that is one of E2 nodes 209 terminating an E2 interface. Similarly, O-CU-CP 215 is a logical node that is one of E2 nodes 209 terminating an E2 interface. Moreover, O-CU-UP 219 is a logical node that is one of E2 nodes 209 terminating an E2 interface.

Many system architectures employ two different types of RICs: near-RT RIC 207, and non-RT RIC 205, which can be adapted to specific latency or control loop requirements. Near-RT RIC 207 can control other RAN elements, including CUs and DUs, and may perform network optimization actions that can take place between 10 milliseconds to one second. Non-RT RIC 205 may incorporate AI and ML to perform network management tasks while working with control loops of over 1 second. Essentially, non-RT RIC 205 may provide near-RT RIC 207 with network and subscriber data, alongside AI based recommendations, while near-RT RIC 207 may provide real-time optimization for mobility management. Furthermore, non-RT RIC 205 can provide high levels of quality assurance, right down to the device level, by monitoring QoE results that have been achieved in practice. As a software hosting platform, controller 302 (FIG. 1) can run applications developed by third party specialist software providers. These applications, known as "xApps" and "rApps", may be configured to run on near-RT RIC 207 or non-RT RIC 205, and act as key enablers for innovation in the O-RAN ecosystem.

O-RU 225 manages the radio-frequency layer and may include antenna arrays of various sizes and shapes. O-DU 223 may be configured to perform lower-layer protocol processing. O-CU-CP 215 and/or O-CU-UP 219 may be configured to perform upper-layer protocol processing. Depending on operator and service requirements, one or more O-eNBs (such as O-eNB 211) can be deployed monolithically, e.g., O-RU 225, O-DU 223, O-CU-CP 215, and O-CU-UP 219 reside within a cell site, or these functionalities can be distributed across cell sites while O-CU-CP 215 and O-CU-UP 219 reside in an edge cloud site controlling a plurality of distributed O-DUs (such as O-DU 223). For example, O-RAN is an approach to networking in which disaggregated functions can be used to deploy mobile fronthaul and midhaul networks. The disaggregated functions can be cloud-based functions. A radio access network implementing the O-RAN architecture will typically include many instances of each type of E2 node, e.g., O-CU-CP, O-CU-DP, O-DU, O-RU, O-eNB, and/or the like.

O-RAN 200 may include a Service Management and Orchestration (SMO) framework 203 offering one or more framework functions, along with non-RT RIC 205. O-RAN 200 architecture includes several interfaces, such as A1, O1 (not shown in FIG. 2), and O2 interfaces (not shown in FIG. 2), that are each used to provide functions and services by which SMO framework 203, non-RT RIC 205 and near-RT RIC 207 can configure or direct other components of O-RAN 200, such as O-eNB 211. For example, SMO framework 203, non-RT RIC 205 and/or near-RT RIC 207 may send control messages for configuring components of O-RAN 200. In some examples, the control messages may be sent over the A1 interface between Non-RT RIC 205 and near-RT RIC 207. In such cases, near-RT RIC 207 may send a corresponding control message over E2 interface(s) to one or more E2 nodes 209. In some examples, the control messages may be sent directly over the over E2 interface(s) between near-RT RIC 207 and one or more E2 nodes 209. For example, the functions and services may include A1 policy management services and/or enrichment information services (collectively referred to herein as "A1 services" because they are offered on the A1 interface), O1 performance management service and O1 configuration management service (referred to herein as "O1 services" or "OAM services" because they are offered on the O1 interface), O2 configuration management services for the O-Cloud (referred to herein as "O2 services" because they are offered on the O2 interface), and/or other services, such as service management and exposure (SME) services (e.g., registration of a service, update of a service registration), data management and exposure (DME) services, and/or AI/ML services.

Aspects of O-RAN 200 may be managed and/or monitored by SMO 203, non-RT RIC 205, and/or near-RT RIC 207. In some aspects, SMO 203, non-RT RIC 205, and near-RT RIC 207 may be operated by the mobile network operator providing 5G services to a tenant. SMO 203 may orchestrate and control management and automation aspects of O-RAN 200 (e.g., network slicing, management, and orchestration of O-Cloud, etc.). Further, SMO 203 may control aspects of non-RT RIC 205 and near-RT RIC 207. Non-real time RIC 205 can provide non-real-time control and optimization of RAN elements and resources such as RUs, DUs, and CUs, workflow management, and policy-based control of applications and features of near-RT RIC 207. Near-real time RIC 207 can provide near-real-time control and optimization of O-RAN 200 elements and resources via fine-grained data collection and actions over an E2 interface. Near-real-time RIC 207 can include enforcement of policies received from non-real-time RIC 205.

For each of the different interfaces O1, A1, etc. non-RT RIC 205 and/or near-RT RIC 207 provide options to the operator to determine the strategy for handling conflicts for various parameters, targets, and so forth. In some examples, SMO 203 supports machine learning (ML) techniques by which SMO 203 obtains telemetry data and/or other metrics that describe the operations of O-RAN 200. SMO 203 may process the telemetry data and/or other metrics using a ML algorithm to train an ML model to predict optimal settings for parameters for targets in case of detected conflicts among multiple applications. These settings may be used by non-RT RIC 205 and/or near-RT RIC 207 to resolve conflicts for parameters for targets among multiple applications by using the predicted optimal settings for the parameters for the targets.

As further described in FIG. 2, non-RT RIC 205 and/or near-RT RIC 207 may deploy as a highly scalable, micro-services based containerized architecture. Non-RT RIC 205 may onboard one or more applications (e.g., rApps (not shown)) that manage non-real time events within non-RT RIC 205. rApps applications represent applications that leverage the functionality exposed via the non-RT RIC framework of non-RT RIC 205. Near-RT RIC 207 may onboard one or more applications (e.g., xApps (not shown)) that manage near-real time events within near-RT RIC 207. xApps applications represent applications that leverage the functionality exposed via the near-RT RIC framework of near-RT RIC 207.

In some instances, functions and/or services provided by non-RT RIC 205 may be in conflict. For example, non-RT RIC functions and services may include A1 services, such as policy management services (e.g., creation and update of A1 policy) and/or enrichment information services (collectively referred to herein as "A1 services"). Non-RT RIC functions and services may also include O1 services (otherwise referred to herein as "OAM services"), such as configuration management services (e.g., provision configuration changes) and O1 performance management services (e.g., request performance management job). Non-RT RIC functions and services may further include O2 services, such as O2 configuration management services for the O-Cloud (e.g., provision configuration changes on O-Cloud), and/or other services, such as service management and exposure (SME) services (e.g., registration of a service, update of a service registration), data management and exposure (DME) services, AI/ML services, or the like.

Figure 3:
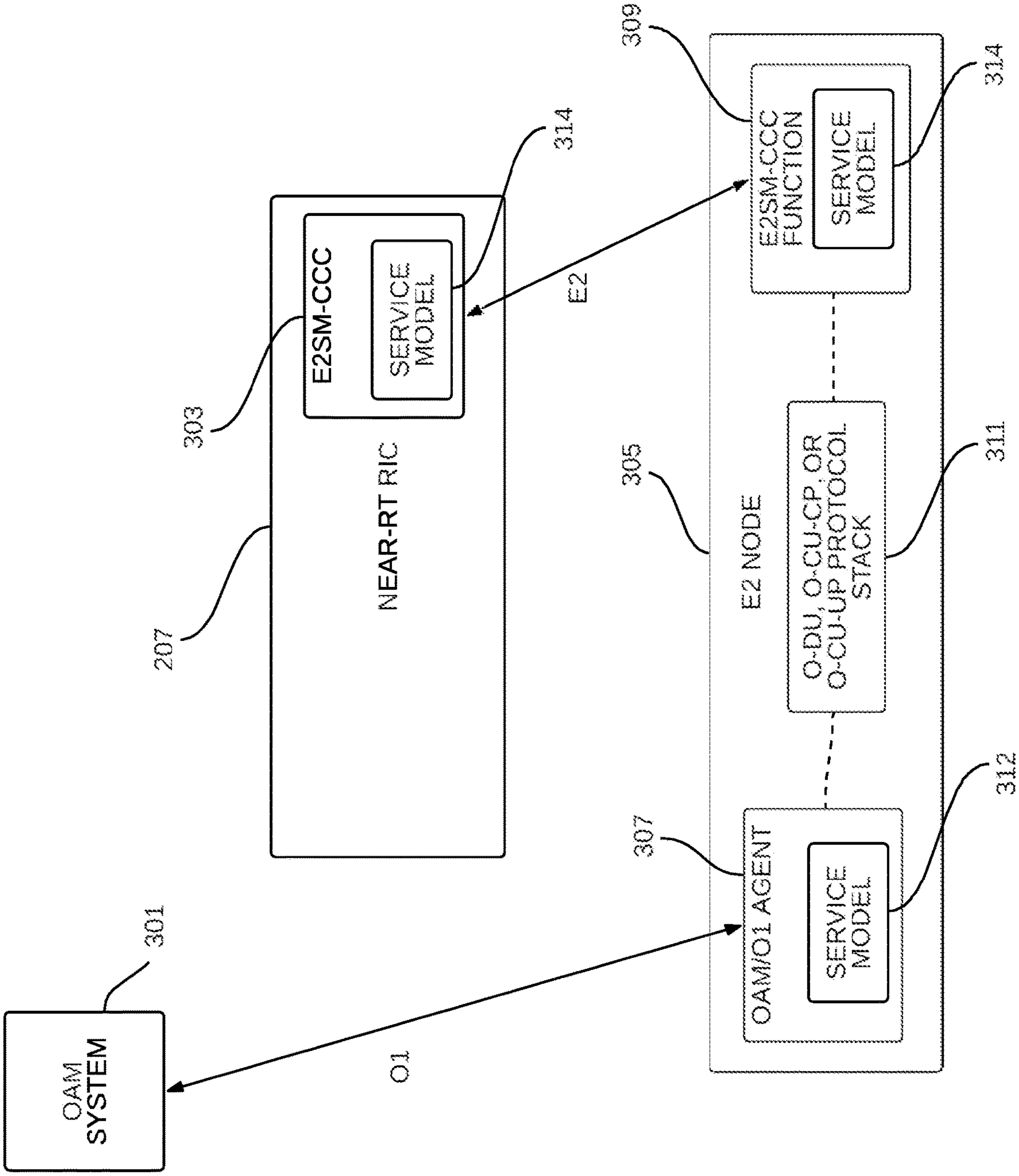
FIG. 3 is a block diagram illustrating an example of a service model for configuring a radio access network, in accordance with one or more techniques of this disclosure.

FIG. 3 is a block diagram illustrating an example of a service model for configuring a radio access network, in accordance with one or more techniques of this disclosure. An Operations, Administration, and Maintenance (OAM) system 301 communicates over an O1 interface with an E2 node 305. E2 node 305 includes an OAM/O1 agent 307 configured with a non-open-RAN (non-O-RAN)-specific service model 312 that utilizes a complex set of reference attributes. The E2 node 305 also includes an E2 service model-cell configuration and control (E2SM-CCC) module 309 configured to implement a service model 314, and an O-DU, O-CU-CP, or O-CU-UP protocol stack 311 (depending on the type of E2 node that E2 node 305 implements). For example, protocol stack 311 may include at least one of a CU protocol stack or a DU protocol stack. Protocol stack 311 may define attributes for configuration of a CU or a DU. Near-RT RIC 207 also implements service model 314 for configuring one or more components of an E2 node for cell configuration and control (E2SM-CCC) 303. For example, near-RT RIC 207 may send one or more control messages over the E2 interface to E2 node 305 to configure one or more components of E2 node 305, such as cell and/or node parameters. E2SM-CCC 303 uses a simplified set of configuration objects for service model 314 based on a complex set of reference attributes from any of OAM, EMS, and/or FCAPS. In some examples, the simplified set of configuration objects comprises a subset of the complex set of reference attributes. In some examples, the complex set of reference attributes refer to one or more other object classes, thereby including one or more inheritance relationships. The simplified set of configuration objects is determined by changing the complex set of reference attributes to a set of first class attributes that do not reference other object classes.

According to another example disclosed herein, service model 314 implemented by E2SM-CCC 303 and E2SM-CCC module 309 across the E2 interface does not employ a distinguished name, such as may be employed by non-O-RAN-specific service model 312, but rather uses a global cell identifier in a control message to provide a more simplified configuration object for configuring the E2 node. A distinguished name includes a unique name that identifies an entry at a corresponding hierarchical level. For example, a distinguished name may uniquely identify a managed object instance within a specific name space. The global cell identifier, by contrast, directly identifies a cell and/or a node of O-RAN 200 (FIG. 2) to which the configuration object pertains. In some examples, near-RT RIC 207 (FIGS. 2 and 3) broadcasts the global cell identifier to one or more E2 nodes to perform at least one of a read operation or a write operation. For example, when configuring a cell and/or node of O-RAN 200 identified by a particular global cell identifier, near-RT RIC 207 may broadcast the particular global cell identifier to one or more E2 nodes to perform a write operation to configure the cell and/or node. When obtaining configuration information from the cell and/or node of O-RAN 200 identified by the particular global cell identifier, near-RT RIC 207 may broadcast the particular global cell identifier to one or more E2 nodes to perform a read operation to obtain configuration information from the cell and/or node.

According to still another example disclosed herein, E2SM-CCC module 309 is configured to report configuration information, such as configuration information of E2 node 305, using service model 314 to near-RT RIC 207. For example, E2SM-CCC module 309 may identify one or more conditions of E2 node 305 and reports the configuration in response thereto. In some examples, the configuration may be reported in response to one or more action triggers. For example, the configuration may be reported upon a change in configuration, for example, as dictated by OAM system 301, upon request from near-RT RIC 207, periodically, and/or the like. According to a further example disclosed herein, E2SM-CCC 303 is configured to manage and monitor at least one O-eNB 211 (FIG. 2).

Because OAM system 301 may control E2 node 305 to change configuration parameters via control messages over the O1 link via OAM/O1 agent 307, it may be desirable for near-RT RIC 207 to receive report messages from E2 node that may include information regarding the configuration of one or more cells and/or nodes. In this manner, both OAM system 301 and near-RT RIC may maintain (e.g., store) appropriate configuration information indicative of the configuration of the network. As such, near-RT RIC 207 may configure triggers upon which E2 node 305 may send a report message to near-RT RIC 207.

A trigger may be based on subscription, may be periodic, or may be on demand. For example, near-RT-RIC 207 may subscribe such that any changes to particular types of configuration parameters and/or configuration parameters of particular cells or nodes trigger E2 node 305 to send a report message including information regarding the change in any existing configuration parameters. In one example, RT-RIC 207 may subscribe to be notified of any O-RRMPolicyRatio attributes that are changed on cell:xyz. In another example, RT-RIC 207 may subscribe to be notified when any O-NR-CellDU or O-RRMPolicyRatio attributes change for any cell. In this manner, near-RT NIC 207 may be notified of interested parameter changes that may be based on configuration messages from OAM system 301, of which near-RT NIC 207 may otherwise be unaware.

Another trigger may be periodic. In the example of a periodic trigger, E2 node 305 may be triggered to send a report message including information regarding configuration parameters on a periodic basis. In some examples, this periodicity is programmable by near-RT RIC 207. In some examples, a periodic trigger may be based on a subscription.

Another trigger may be on demand. For example, E2 node 305 may be triggered to send a report message including information regarding configuration parameters based on receiving a request from near-RT RIC 207.

In some examples, triggers may be implemented using JavaScript Object Notation (JSON). For example, near-RT RIC 207 (e.g., via an xApp) may be able to retrieve or receive existing configuration information of E2 node 305 once (e.g., upon request) or periodically. Near-RT RIC 207 (e.g., via an xApp), e.g., upon subscription, be notified by E2 node 305 when a configuration change occurs (e.g., an attribute change, a new provision/addition, a deletion, etc.). In some examples, Near-RT RIC 207 (e.g., via an xApp), may be able to retrieve or receive a subset of configuration information, such as node-level parameters including attribute values of E2SM-CCC specific data structures that are linked to a specific E2 node (e.g., E2 node 305) rather than a particular cell, or such as attribute values of E2SM-CCC specific data structures that are linked to a specific cell.

Example configuration parameters may include resource allocation, such as physical resource block (PRB) resource allocations, priority values, power parameters, frequency parameters, timing parameters, or the like.

The techniques may provide one or more technical advantages that realize at least one practical application. For example, the techniques in this disclosure may provide a service model 314 for the E2 interface specifically for cell configuration and control, e.g., configuring E2 nodes in a radio access network (RAN) and, more particularly, in a RAN deployed according to the O-RAN framework. Moreover, the techniques in this disclosure may provide a service model such that an operator may configure various settings of the RAN. As RANs continue to evolve towards a more open architecture, opportunities for innovation in the O-RAN space have proliferated. One of the central components within O-RAN architecture is the RIC, which provides an open hosting platform and is responsible for controlling and optimizing one or more RAN functions.

Figure 4:
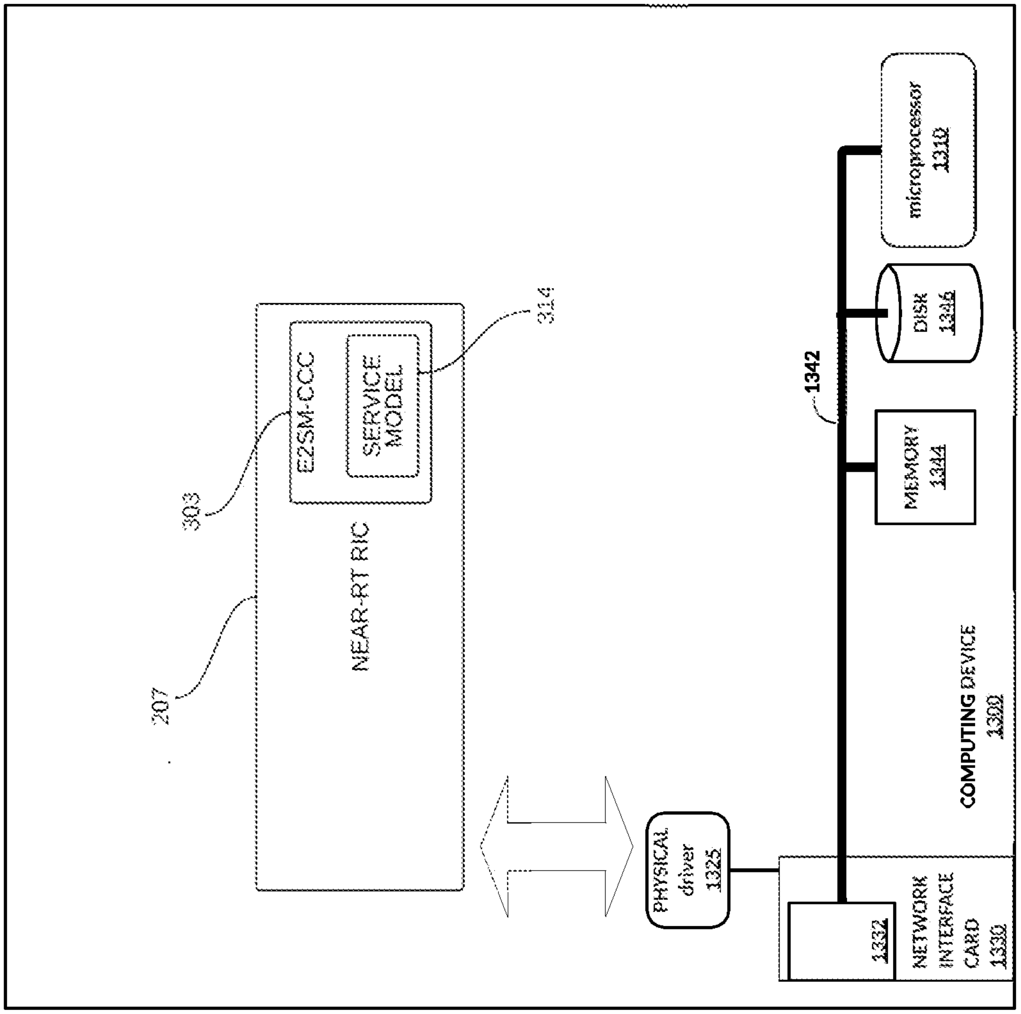
FIG. 4 is a block diagram of an example computing device for implementing a RAN intelligent controller (RIC), according to techniques described in this disclosure.

FIG. 4 is a block diagram of an example computing device (e.g., host), according to techniques described in this disclosure. Computing device 1300 may represent a real or virtual server and may represent an example instance of any of controller 302 or near-RT RIC 207 (FIG. 3). Computing device 1300 includes in this example, a bus 1342 coupling hardware components of a computing device 1300 hardware environment. Bus 1342 couples network interface card (NIC) 1130, storage disk 1346, and one or more microprocessors 1310 (hereinafter, "microprocessor 1310"). NIC 1330 may be SR-IOV-capable. Bus 1342 may in some cases couple microprocessor 1310 and a memory 1344. In some examples, bus 1342 may couple memory device 244, microprocessor 810, and NIC 230. Bus 1342 may represent a Peripheral Component Interface (PCI) express (PCIe) bus. In some examples, a direct memory access (DMA) controller may control DMA transfers among components coupled to bus 1342. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 1332 configured to exchange packets using links of an underlying physical network. Interfaces 1332 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel executing in kernel space. The Kernel may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes Kernel may provide an execution environment for one or more processes in user space. The Kernel may include a physical driver 1325 for using network interface card 1330. Network interface card 1330 may also implement SR-IOV to enable sharing the physical network function (I/O) among one or more virtual execution elements, and/or one or more virtual machines (not shown). Shared virtual devices such as virtual functions may provide dedicated resources such that each of the virtual execution elements may access dedicated resources of NIC 1330, which therefore appears to each of the virtual execution elements as a dedicated NIC. Virtual functions may represent lightweight PCIe functions that share physical resources with a physical function and with other virtual functions. For an SR-IOV-capable NIC 1330, NIC 1330 may have thousands of available virtual functions according to the SR-IOV standard, but for I/O-intensive applications the number of configured virtual functions is typically much smaller.

Computing device 1300 may be coupled to a physical network switch fabric that includes an overlay network that extends switch fabric from physical switches to software or "virtual" routers of physical servers coupled to the switch fabric. Virtual routers may be processes or threads, or a component thereof, executed by the physical servers, e.g., controller 302 or near-RT RIC 207 of FIG. 4, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers.

Computing device 1300 of FIG. 4 executes software for a near-RT RIC 207, including an E2SM-CCC module 303 that implements an E2SM-CCC service model 314 according to techniques of this disclosure. Although shown and described as executing on a single computing device, one more computing devices of a computing system may execute near-RT RIC 207 as one or more distributed applications.

Figure 5:
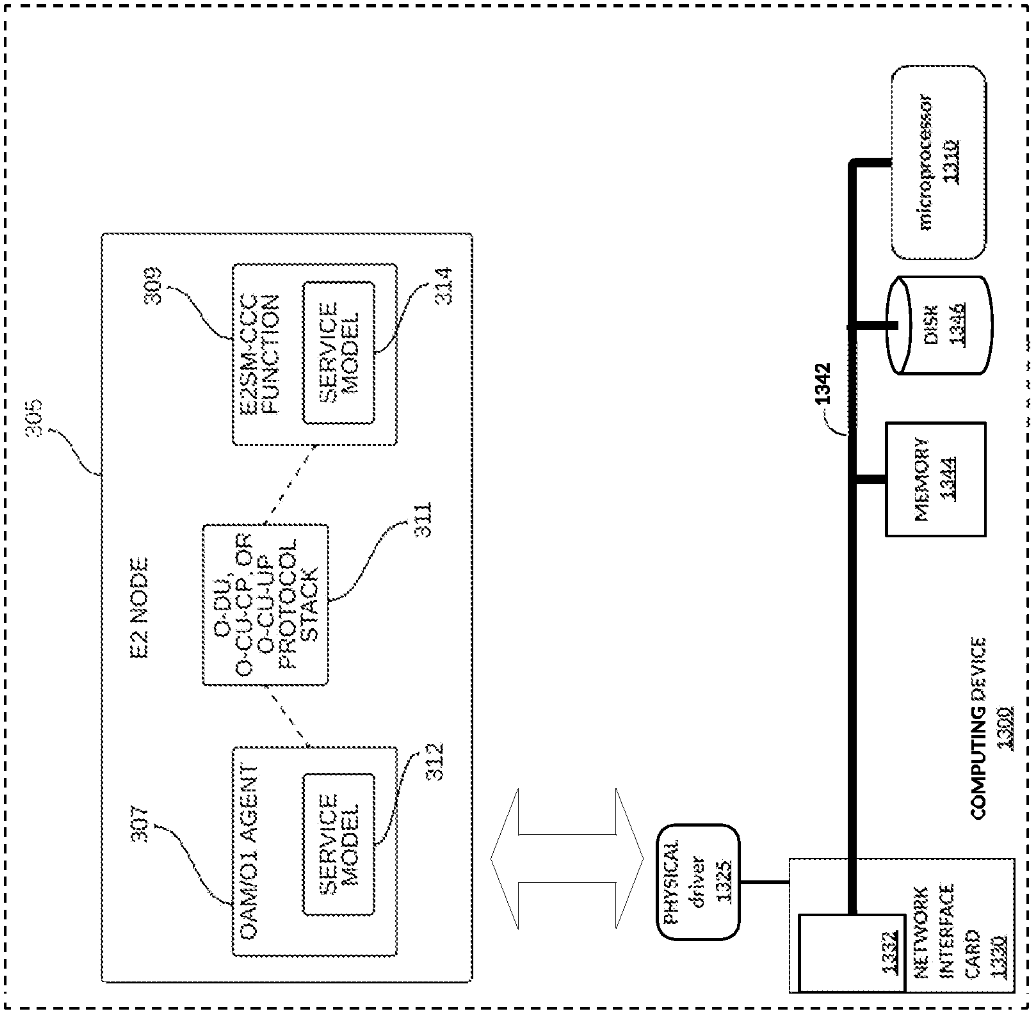
FIG. 5 is a block diagram of an example computing device for implementing an E2 node, according to techniques described in this disclosure.

FIG. 5 is a block diagram of another example computing device for implementing an E2 node, according to techniques described in this disclosure. Computing device 1300 of FIG. 5 is similar in many respects to computing device 1300 of FIG. 4, but executes software to implement an E2 node rather than a near-RT RIC. That is, computing device 1300 of FIG. 5 executes software for an E2 node 305 (which may represent an instance of any of E2 nodes 209 of FIG. 2), including an E2SM-CCC module 309 that implements an E2SM-CCC service model 314 according to techniques of this disclosure. Although shown and described as executing on a single computing device, one more computing devices of a computing system may implement E2 node 305 as one or more distributed applications.

Figure 6:
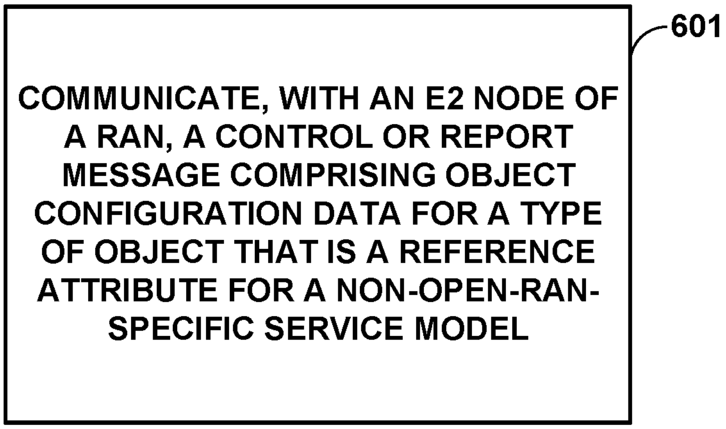
FIG. 6 is a flow diagram illustrating an example of configuring a radio access network using a service model, in accordance with one or more techniques of the disclosure.

FIG. 6 is a flow diagram illustrating an example of configuring a radio access network using a service model, in accordance with one or more techniques of the disclosure. Near-RT RIC 207 may communicate, with an E2 node of a RAN (e.g., E2 node 305), a control or report message comprising object configuration data for a type of object that is a reference attribute for a non-O-RAN-specific service model (601). This control or report message may be of a first service model, such as service model 314, which may be an E2 service model. The non-O-RAN-specific service model may be a second service model, such as service model 312. Such reference attributes may be, for example, nRSectorCarrierRef, bWPRef, nRFrequencyRef, victimSetRef, or aggressorSetRef of the NRCellDU parameters from 3GPP 28.541. Such attributes are explicitly defined as "Ref Attr" or reference attributes relations in a configuration hierarchy and therefore refer to other objects in the configuration hierarchy for corresponding configuration data. By contrast, service model 314 for the E2 interface for cell configuration and control may include object configuration data for the above types of objects as "first class" objects embedded within messages having configuration data according to service model 314.

Figure 7:
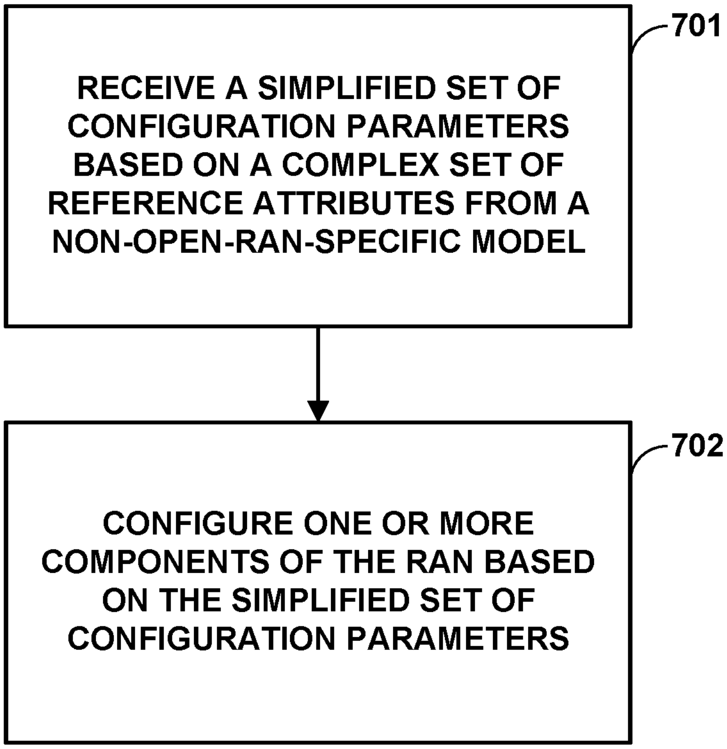
FIG. 7 is a flow diagram illustrating another example of configuring a radio access network using a service model, in accordance with one or more techniques of the disclosure.

FIG. 7 is a flow diagram illustrating another example of configuring a radio access network using a service model, in accordance with one or more techniques of the disclosure. Near-RT RIC 207 may receive a simplified set of configuration parameters based on a complex set of reference attributes from a non-O-RAN-specific model (701). For example, Near-RT RIC 207 may store service model 314 which may include the simplified set of configuration parameters. Near-RT RIC 207 may configure one or more components of the RAN based on the simplified set of configuration parameters (702). For example, near-RT RIC 207 may send a configuration message to E2 node 305, using one or more configuration parameters of the simplified set of configuration parameters to configure the one or more components of the RAN.

Figure 8:
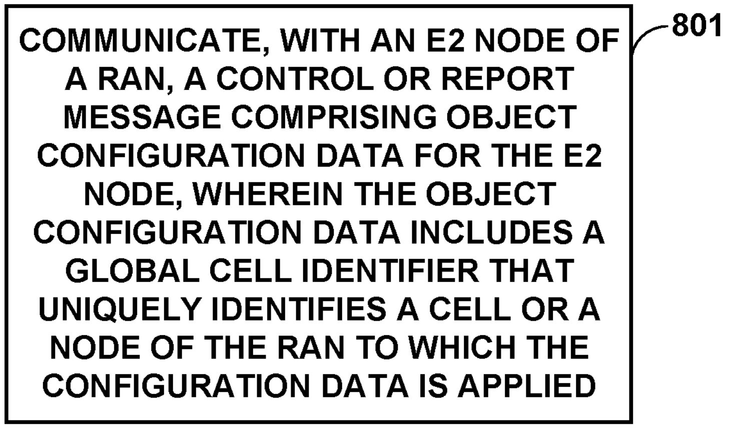
FIG. 8 is a flow diagram illustrating yet another example of configuring a radio access network using a service model, in accordance with one or more techniques of the disclosure.

FIG. 8 is a flow diagram illustrating yet another example of configuring a radio access network using a service model, in accordance with one or more techniques of the disclosure. Near-RT RIC 207 may communicate, with an E2 node of a RAN (e.g., E2 node 305), a control or report message comprising object configuration data for the E2 node, wherein the object configuration data includes a global cell identifier that uniquely identifies a cell or node of the RAN to which the object configuration data is applied (e.g., to be applied and/or is applicable) (801). For example, the object configuration data may include the global cell identifier rather than a distinguished name.

Figure 9:
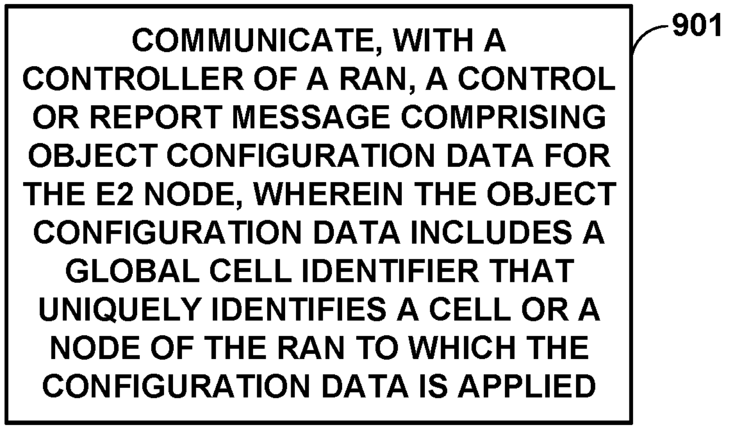
FIG. 9 is a flow diagram illustrating still another example of configuring a radio access network using a service model, in accordance with one or more techniques of the disclosure.

FIG. 9 is a flow diagram illustrating still another example of configuring a radio access network using a service model, in accordance with one or more techniques of the disclosure. E2 node 305 may communicate with a controller of a RAN (e.g., near-RT RIC 207), a control or report message comprising object configuration data for an E2 node, wherein the object configuration data includes a global cell identifier that uniquely identifies a cell or node of the RAN to which the object configuration data is applied (e.g., to be applied and/or is applicable) (901). For example, E2 node 305 may receive a control message or a report message from near-RT RIC 207 including a global cell identifier, rather than a distinguished name. In response, E2 node 305 may configure the identified cell or node in accordance with the object configuration data and/or report configuration information for the identified cell or node back to near-RT RIC 207.

Figure 10:
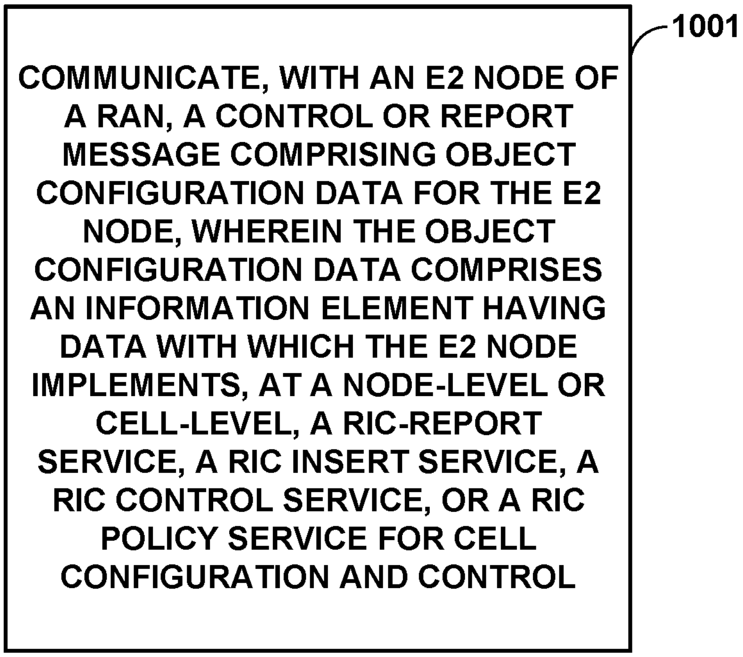
FIG. 10 is a flow diagram illustrating yet another example of configuring a radio access network using a service model, in accordance with one or more techniques of the disclosure.

FIG. 10 is a flow diagram illustrating yet another example of configuring a radio access network using a service model, in accordance with one or more techniques of the disclosure. Near-RT RIC 207 may communicate, with an E2 node of a RAN (e.g., E2 node 305), a control or report message comprising object configuration data for the E2 node, wherein the object configuration data comprises an Information Element having data with which the E2 node implements, at a node-level or cell-level, a RIC REPORT service, a RIC INSERT service, a RIC CONTROL service, or a RIC POLICY service for cell configuration and control (1001). For example, near-RT RIC 207 may send to, or receive from E2 node 305, such a control or report message.

Figure 11:
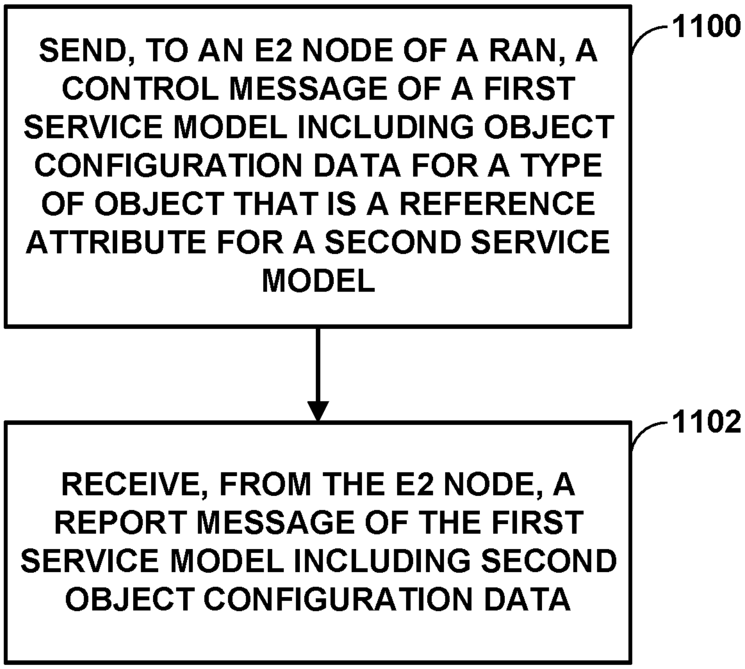
FIG. 11 is a flow diagram illustrating an example of techniques for configuring a radio access network according to one or more aspects of this disclosure.

FIG. 11 is a flow diagram illustrating an example of techniques for configuring a radio access network according to one or more aspects of this disclosure. Near-RT RIC 207 may send, to an E2 node of the RAN, a control message of a first service model comprising first object configuration data for a type of object that is a reference attribute for second service model (1100). For example, near-RT RIC 207 may send a control message to E2 node 305 using a first service model (e.g., service model 314) to configure one or more nodes or cells. The second service model may be a non-ORAN-specific service model, such as service model 312.

Near-RT RIC 207 may receive, from the E2 node, a report message of the first service model comprising second object configuration data (1102). For example, near-RT RIC 207 may receive, from E2 node 305, the report message. The report message may be responsive to a trigger, such as a subscription of near-RT RIC 207, a periodic trigger, or a request from near-RT RIC 207.

In some examples, the first service model is an open-RAN (O-RAN)-specific service model and the second service model is a non-open RAN (non-O-RAN)-specific service model. In some examples, the first service model includes an E2 Service Model for Cell Configuration and Control (E2SM-CCC) and the second service model includes an O1 interface. In some examples, the controller (e.g., near-RT RIC 207) is a Near-Real Time Radio Access Network Intelligent Controller (near-RT RIC).

In some examples, the first object configuration data includes an Information Element having data with which the E2 node implements, at a node-level or cell-level, a RIC REPORT service, a RIC INSERT service, a RIC CONTROL service, or a RIC POLICY service for cell configuration and control. In some examples, near-RT RIC 207 may receive, from E2 node 305, a control outcome message, in response to the control message, the control outcome message comprising an indication of whether a change one or more configuration parameter based on the control message was successful.

In some examples, the second object configuration data includes existing configuration parameters, the existing configuration parameters being of the first service model. For example, the existing configuration parameters may be parameters which the E2 node may have already implemented at a node-level or cell-level under which the node or cell may be operating. In some examples, near-RT RIC 207 may store the existing configuration parameters in the one or more memories. In some examples, the report message is a first report message. In some examples, near-RT RIC 207 may receive, from E2 node 305, a second report message, the second report message including an indication of a change in the existing configuration parameters. In some examples, the indication of the change in the existing configuration parameters includes at least one of a change type of the change or an old value and a new value of at least one changed configuration parameter. In some examples, near-RT RIC 207 may update the stored existing configuration parameters based on the indication of the change in the existing configuration parameters.

In some examples, near-RT RIC 207 may subscribe to notifications from the E2 node. In some examples, the notifications include at least one or more of periodic notifications or change-based notifications. In some examples, the report message is one notification of the notifications and is received based on a subscription to the notifications.

In some examples, the first object configuration data includes attributes associated with at least one of a central unit (CU) protocol stack or a distributed unit (DU) protocol stack. In some examples, near-RT RIC 207 may send the control message in response to receiving a user input or an indication of a decision of an application to change one or more configuration parameters of the first object configuration data. As used herein, a decision of an application is intended to include a decision made by one or more processors executing the application. In some examples, such an application may be an xApp. The indication of the decision of the application may include a command.

Figure 12:
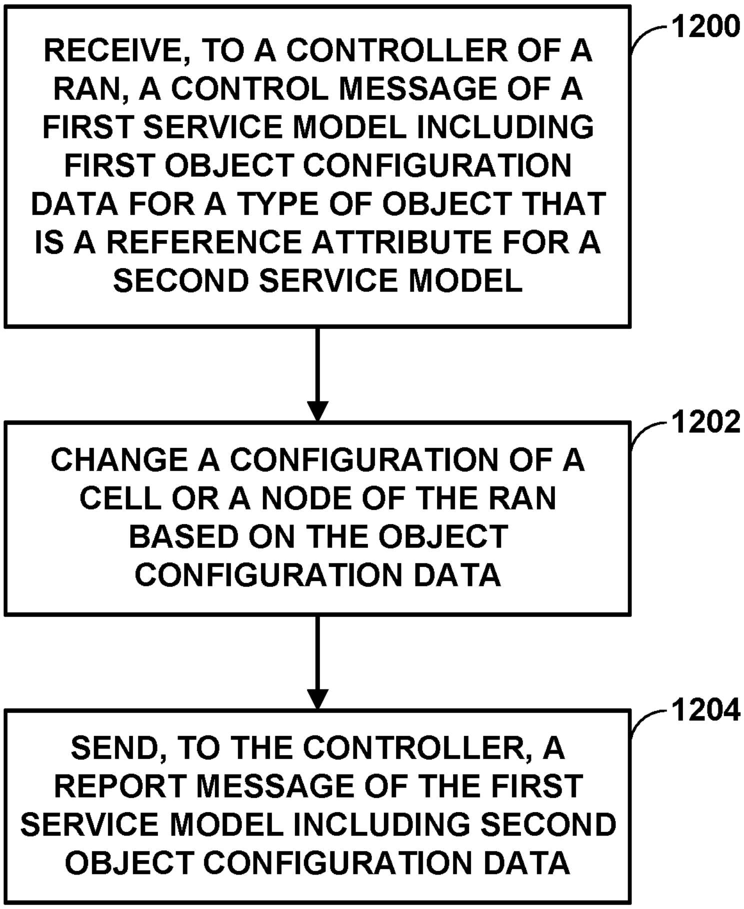
FIG. 12 is a flow diagram illustrating another example of techniques for configuring a radio access network according to one or more aspects of this disclosure.

FIG. 12 is a flow diagram illustrating another example of techniques for configuring a radio access network according to one or more aspects of this disclosure. E2 node 305 may receive, from a controller of the RAN, a control message of a first service model comprising object configuration data for a type of object that is a reference attribute for second service model (1200). For example, E2 node 305 may receive a control message from near-RT RIC 207 including the object configuration data for configuration of one or more nodes or cells.

E2 node 305 may change a configuration of a cell or a node of the RAN based on the object configuration data (1202). For example, E2 node 305 may change the configuration of the cell or node in accordance with the received object configuration data of the control message. E2 node 305 may send, to the controller, a report message of the first service model including second configuration data (1204). For example, E2 node 305 may send to near-RT RIC 207 the report message. The report message may be responsive to a trigger, such as a subscription of near-RT RIC 207, a periodic trigger, or a request from near-RT RIC 207.

In some examples, the first service model is an open-RAN (O-RAN)-specific service model and the second service model is a non-open RAN (non-O-RAN)-specific service model. In some examples, the first service model includes an E2 Service Model for Cell Configuration and Control (E2SM-CCC) and the second service model includes an O1 interface. In some examples, the controller is a Near-Real Time Radio Access Network Intelligent Controller (near-RT RIC).

In some examples, the controller is a first controller configured to operate according to the first service model. In some examples, E2 node 305 may send, to a second controller (e.g., OAM system 301), a report message in accordance with the second service model (e.g., O1) indicative of the changed configuration.

In some examples, the object configuration data includes an Information Element having data with which the E2 node implements, at a node-level or cell-level, a RIC REPORT service, a RIC INSERT service, a RIC CONTROL service, or a RIC POLICY service for cell configuration and control.

In some examples, E2 node 305 may send, to the controller, a control outcome message, in response to the control message. The control outcome message may include an indication of whether a change in configuration parameters based on the control message was successful. For example, E2 node 305 may attempt to make one or more changes to network 200 based on the control message and may send the control outcome message to report on whether the changes were successful or not.

In some examples, E2 node 305 may responsive to a trigger, obtain existing configuration parameters of a cell or a node of the RAN according to the first service model and send, to the controller, a report message. For example, the second object configuration data may include the existing configuration parameters.

In some examples, the report message is a first report message. In some examples, E2 node 305 may determine a change in the existing configuration parameters of the cell or the node. In some examples, E2 node 305 may send, responsive to a subscription trigger and to the controller, a second notification of indicative of the change in the existing configuration parameters. In some examples, the object configuration data includes attributes associated with at least one of a central unit (CU) protocol stack or a distributed unit (DU) protocol stack.

Figure 13:
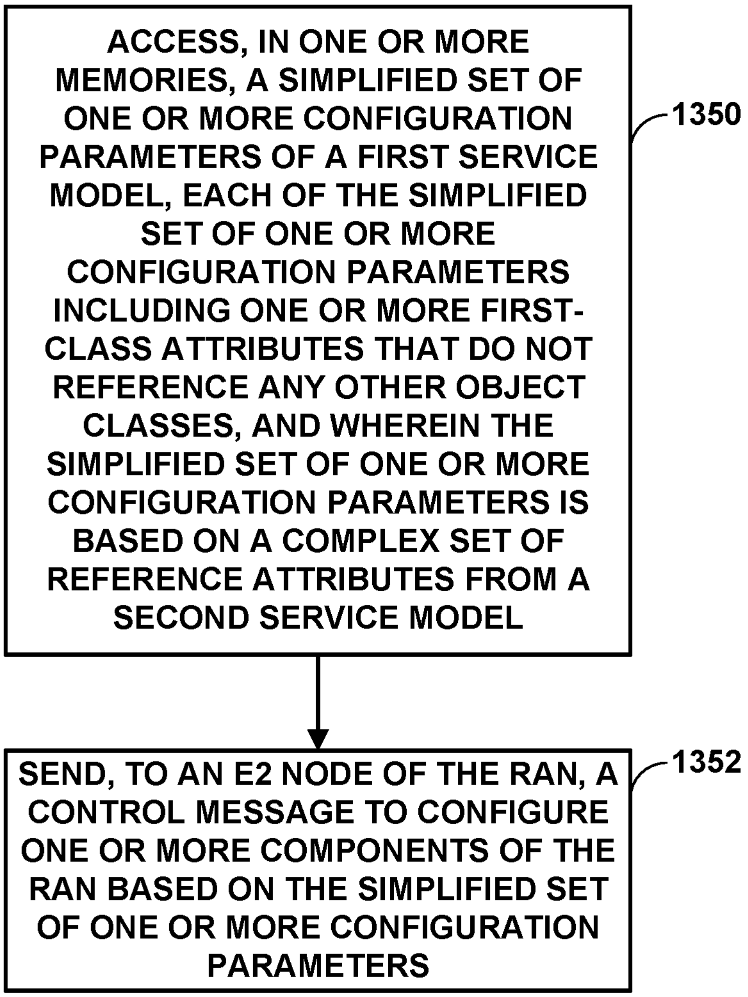
FIG. 13 is a flow diagram illustrating another example of techniques for configuring a radio access network according to one or more aspects of this disclosure.

FIG. 13 is a flow diagram illustrating another example of techniques for configuring a radio access network according to one or more aspects of this disclosure. Near-RT RIC 207 may access, in one or more memories, a simplified set of one or more configuration parameters of a first service model, each of the simplified set of one or more configuration parameters including one or more first-class attributes that do not reference any other object classes, and wherein the simplified set of one or more configuration parameters is based on a complex set of reference attributes from second service model (1350). For example, near-RT RIC 207 may access service model 314 in memory 1344 (FIG. 4) to access the simplified set of configuration parameters. Near-RT RIC 207 may send, to an E2 node of the RAN, a control message to configure one or more components of the RAN based on the simplified set of one or more configuration parameters (1352). For example, near-RT RIC 207 may send a control message in accordance with service model 314 to E2 node 305 to configure the one or more components of the RAN.

In some examples, the first service model, is a first open-RAN (O-RAN)-specific service model and the second service model is one of a second O-RAN-specific service model or a non-open RAN (non-O-RAN)-specific service model. In some examples, the non-O-RAN-specific model comprises at least one of an Operations, Administration, and Maintenance (OAM) model, an Element Management System (EMS) model, a Fault, Configuration, Accounting, Performance and Security (FCAPS) model, or a 5G Network Resource Model. In some examples, the controller (e.g., near-RT NIC 207) is a Near-Real Time Radio Access Network Intelligent Controller (near-RT RIC) and the second O-RAN-specific service model comprises an O1 interface.

In some examples, the simplified set of one or more configuration parameters includes a subset of the complex set of reference attributes.

In some examples, near-RT RIC 207 may receive, from the E2 node, a report message of the first service model comprising at least one of object configuration data or a control outcome message comprising an indication of whether a change in one or more configuration parameters based on the control message was successful. In some examples, near-RT RIC 207 may subscribe to notifications from the E2 node. In some examples, the notifications include at least one or more of periodic or change-based notifications. In some examples, the report message is one notification of the notifications and is received based on a subscription to the notifications. In some examples, the object configuration data includes existing configuration parameters. In some examples, near-RT RIC 207 may store the existing configuration parameters in the one or more memories (e.g., of memory 1344). In some examples, the report message is a first report message. In some examples, near-RT RIC 207 may receive, from the E2 node and based on the subscription, a second report message, the second report message including an indication of a change in the existing configuration parameters including at least one of a change type of the change or an old value and a new value of at least one changed configuration parameter. In some examples, near-RT RIC 207 may update the stored existing configuration parameters based on the indication of the change in the existing configuration parameters.

In some examples, the simplified set of one or more configuration parameters includes attributes associated with at least one of a central unit (CU) protocol stack or a distributed unit (DU) protocol stack. In some examples, near-RT RIC 207 may send the control message in response to receiving a user input or an indication of a decision of an application to change a configuration parameter in the simplified set of one or more configuration parameters.

Figure 14:
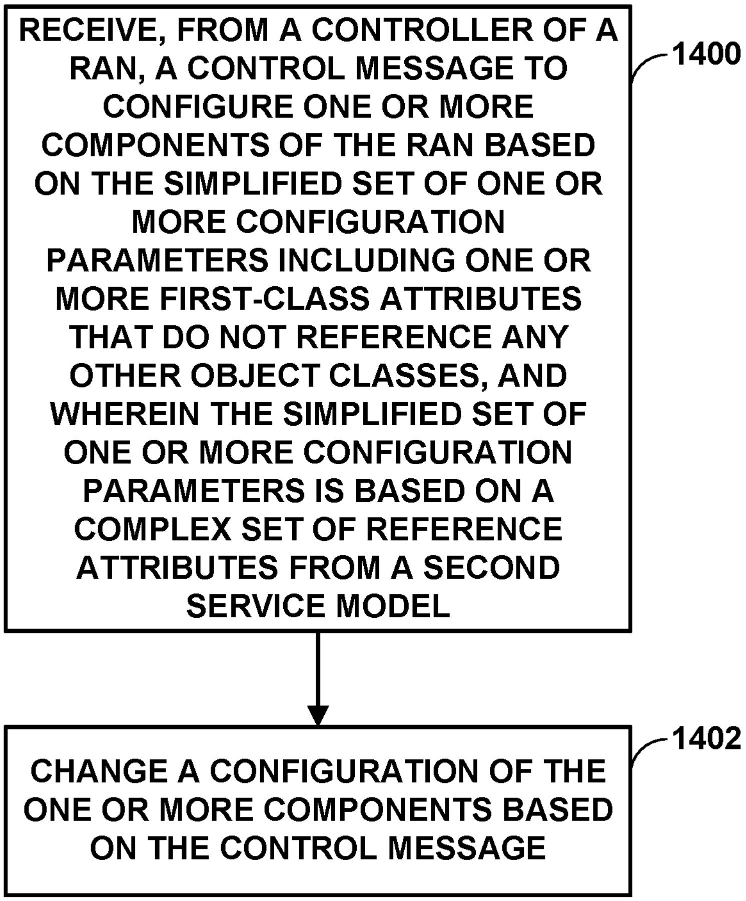
FIG. 14 is a flow diagram illustrating another example of techniques for configuring a radio access network according to one or more aspects of this disclosure.

FIG. 14 is a flow diagram illustrating another example of techniques for configuring a radio access network according to one or more aspects of this disclosure. E2 node 305 may receive, from a controller of the RAN, a control message to configure one or more components of the RAN based on a simplified set of one or more configuration parameters of a first service model, each of the simplified set of one or more configuration parameters including one or more first-class attributes that do not reference any other object classes, and wherein the simplified set of one or more configuration parameters is based on a complex set of reference attributes from a second service model (1400). For example, E2 node 305 may receive the control message from near-RT RIC in accordance with the E2 service model.

E2 node 305 may change a configuration of the one or more components based on the control message (1402). For example, E2 node 305 may change the configuration of one or more nodes or cells in accordance with the control message.

In some examples, the first service model, is a first open-RAN (O-RAN)-specific service model and the second service model is one of a second O-RAN-specific service model or a non-open RAN (non-O-RAN)-specific service model. In some examples, the non-O-RAN-specific model comprises at least one of an Operations, Administration, and Maintenance (OAM) model, an Element Management System (EMS) model, a Fault, Configuration, Accounting, Performance and Security (FCAPS) model, or a 5G Network Resource Model. In some examples, the controller is a Near-Real Time Radio Access Network Intelligent Controller (near-RT RIC) and the second O-RAN-specific service model comprises an O1 interface.

In some examples, the simplified set of one or more configuration parameters comprises a subset of the complex set of reference attributes. In some examples, E2 node 305 may send, to the controller, a control outcome message, in response to the control message. The control outcome message may include an indication of whether a change in configuration parameters based on the control message was successful. For example, E2 node 305 may attempt to make one or more changes to network 200 based on the control message and may send the control outcome message to report on whether the changes were successful or not.

In some examples, the controller is a first controller configured to operate according to the first service model and the response is a first response according to the first service model. In some examples, E2 node 305 may send, to a second controller (e.g., OAM system 301), a second response in accordance with the second service model indicative of the changed configuration of the one or more components.

In some examples, E2 node 305 may, responsive to a trigger, obtain existing configuration parameters of a cell or a node of the RAN according to the first service model and send, to the controller, a report message comprising the existing configuration parameters. In some examples, the report message is a first report message. In some examples, E2 node 305 may determine a change in the existing configuration parameters of the cell or the node. In some examples, E2 node 305 may send, responsive to a subscription trigger and to the controller, a second notification of indicative of the change in the configuration parameters. In some examples, the configuration parameters comprise attributes associated with at least one of a central unit (CU) protocol stack or a distributed unit (DU) protocol stack.

Figure 15:
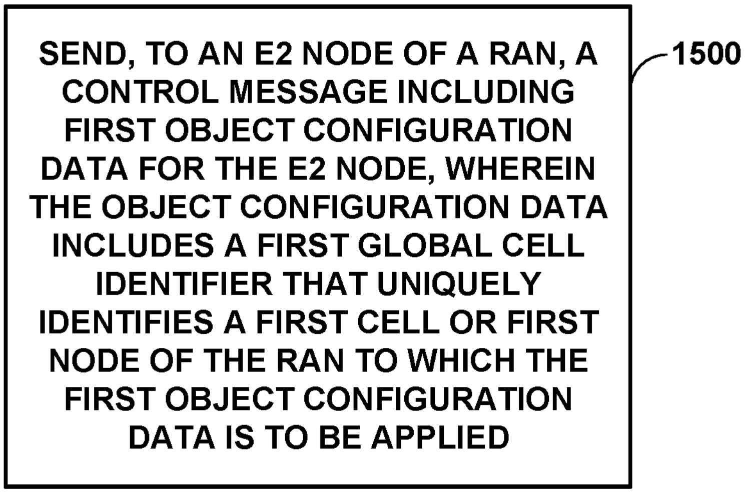
FIG. 15 is a flow diagram illustrating another example of techniques for configuring a radio access network according to one or more aspects of this disclosure.

FIG. 15 is a flow diagram illustrating another example of techniques for configuring a radio access network according to one or more aspects of this disclosure. Near-RT RIC 207 may send, to an E2 node of a RAN, a control message comprising first object configuration data for the E2 node, wherein the first object configuration data includes a first global cell identifier that uniquely identifies a first cell or first node of the RAN to which the first object configuration data is to be applied (1500). For example, near-RT RIC 207 may send the control message to E2 node 305 including the first global cell identifier.

In some examples, near-RT RIC 207 may receive, from the E2 node, a report message comprising second object configuration data, wherein the second object configuration data includes a second global cell identifier that uniquely identifies a second cell or second node of the RAN to which the second object configuration data is applied. For example, near-RT RIC 207 may receive the report message from E2 node 305 including the second global cell identifier.

In some examples, the control message is of a first service model, and wherein the E2 node is configured to operate under the first service model and a second service model. In some examples, the first service model is a first open-RAN (O-RAN)-specific service model and the second service model is one of a second O-RAN-specific service model comprising an O1 interface or a non-open RAN (non-O-RAN)-specific service model. In some examples, the controller (e.g., near-RT RIC 207) is a Near-Real Time Radio Access Network Intelligent Controller (near-RT RIC).

In some examples, the control message does not include a distinguished name. In some examples, the distinguished name includes a unique name that identifies an entry at a corresponding hierarchical level. In some examples, the global cell identifier provides a direct access to at least one of the cell or the node.

In some examples, near-RT RIC 207 may store existing configuration parameters associated with the first object configuration data in memory 1344 (FIG. 4). In some examples, near-RT RIC 207 may subscribe to notifications from the E2 node, wherein the notifications include at least one or more of periodic notifications or change-based notifications. In some examples, near-RT RIC 207 may receive, from the E2 node and based on a subscription, a report message, the report message including an indication of a change in the existing configuration parameters including at least one of a change type of the change or an old value and a new value of at least one changed configuration parameter. In some examples, near-RT RIC 207 may update the stored existing configuration parameters based on the indication of the change in the existing configuration parameters.

In some examples, the first object configuration data include attributes associated with at least one of a central unit (CU) protocol stack or a distributed unit (DU) protocol stack. In some examples, near-RT RIC 207 may send the control message in response to receiving a user input or an indication of decision of an application to change a configuration parameter for an object in a service model for the E2 node.

Figure 16:
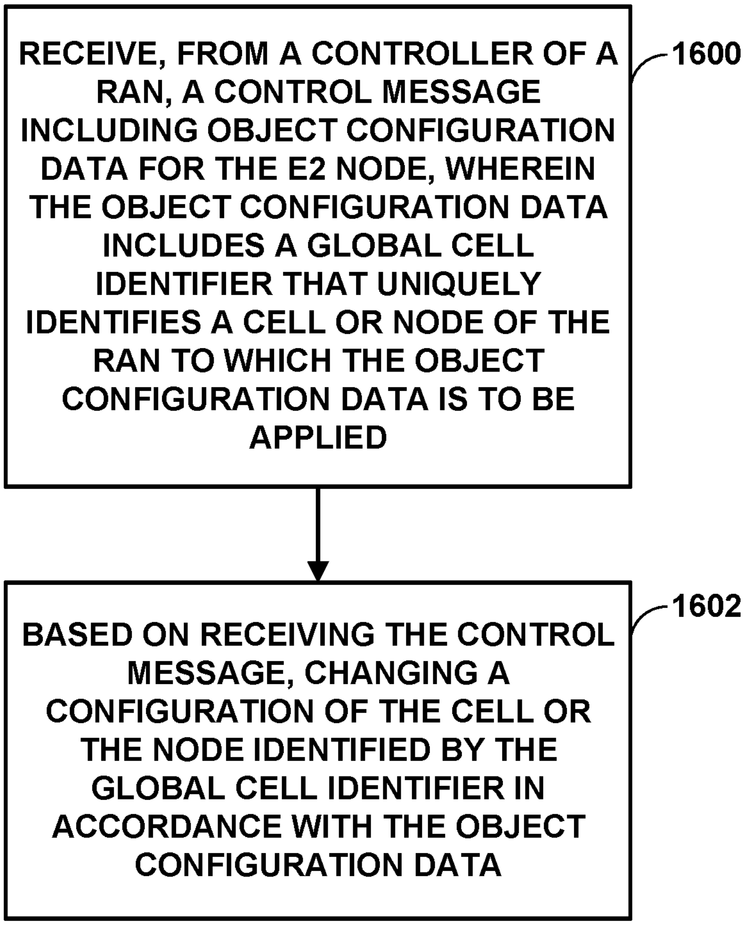
FIG. 16 is a flow diagram illustrating another example of techniques for configuring a radio access network according to one or more aspects of this disclosure.

FIG. 16 is a flow diagram illustrating another example of techniques for configuring a radio access network according to one or more aspects of this disclosure. E2 node 305 may receive, from a controller of the RAN, a control message comprising object configuration data for the E2 node, wherein the object configuration data includes a global cell identifier that uniquely identifies a cell or node of the RAN to which the object configuration data is to be applied (1600). For example, E2 node 305 may receive the control message from near-RT RIC 207 with the object configuration data that includes the global cell identifier.

E2 node 305, may, based on receiving the control message, changing a configuration of the cell or the node identified by the global cell identifier in accordance with the object configuration data (1602). For example, E2 node 305 may configure the cell or the node identified by the global cell identifier based on the object configuration data.

In some examples, control message is of a first service model and E2 node 305 is configured to operate under the first service model and a second service model. In some examples, the controller is a first controller configured to operate according to the first service model. In some examples, E2 node 305 may send, to a second controller (e.g., OAM system 301), a report message in accordance with the second service model indicative of the changed configuration. In some examples, the first service model is a first open-RAN (O-RAN)-specific service model and the second service model is one of a second O-RAN-specific service model comprising an O1 interface or a non-open RAN (non-O-RAN)-specific service model. In some examples, the first service model is an O1 Information model (e.g., an O1 Service model) and the second service model is an E2 service model. In some examples, E2 node 305 may translate data including the cell identifier from the E2 service model to the O1 Information model that includes a distinguished name. In some examples, the distinguished name includes a unique name that identifies an entry at a corresponding hierarchical level, and the global cell identifier is configured to provide a direct access to at least one of a cell or a node of the RAN. In some examples, as part of changing the configuration of the cell or the node, E2 node 305 may broadcast the global cell identifier to one or more nodes of the RAN to provide a write operation.

In some examples, E2 node 305 may, responsive to a trigger, obtain existing configuration parameters of a cell or a node of the RAN according to the first service model. In some examples, E2 node 305 may, send, to the controller, a report message comprising the existing configuration parameters. In some examples, as part of obtaining the existing configuration parameters, E2 node 305 may broadcast the global cell identifier to one or more nodes of the RAN to provide a read operation.

In some examples, the report message is a first report message. In some examples, E2 node 305 may determine a change in the existing configuration parameters of the cell or the node. In some examples, E2 node 305 may send, responsive to a subscription trigger and to the controller, a second notification of indicative of the change in the configuration parameters. In some examples, the configuration parameters include attributes associated with at least one of a central unit (CU) protocol stack or a distributed unit (DU) protocol stack.

Additional examples of a network system that performs conflict management according to techniques of this disclosure are described in the attached Appendix. Aspects and techniques illustrated and described in the Appendix may be implemented by any of network systems, non-RT RICs, or near-RT RICs described herein, such as O-RAN 200, non-RT RIC 205, or near-RT RIC 207 (FIG. 2).

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A controller for a radio access network (RAN), the controller comprising:
- one or more processors; and
- one or more memories coupled to the one or more processors, the one or more memories storing instructions to cause the one or more processors to:
  - send, to an E2 node of the RAN, a control message of a first service model comprising first object configuration data for a type of object that is a reference attribute for a second service model; and
  - receive, from the E2 node, a report message of the first service model comprising second object configuration data.

2. The controller of claim 1, wherein the first service model is an open-RAN (O-RAN)-specific service model and the second service model is a non-open RAN (non-O-RAN)-specific service model.

3. The controller of claim 1, wherein the first service model comprises an E2 Service Model for Cell Configuration and Control (E2SM-CCC) and the second service model comprises an O1 interface.

4. The controller of claim 1, wherein the controller is a Near-Real Time Radio Access Network Intelligent Controller (near-RT RIC).

5. The controller of claim 1, wherein the first object configuration data comprises an Information Element having data with which the E2 node implements, at a node-level or cell-level, a RIC REPORT service, a RIC INSERT service, a RIC CONTROL service, or a RIC POLICY service for cell configuration and control.

6. The controller of claim 1, wherein the instructions further cause the one or more processors to receive, from the E2 node, a control outcome message, in response to the control message, the control outcome message comprising an indication of whether a change in one or more configuration parameters based on the control message was successful.

7. The controller of claim 1, wherein the second object configuration data comprises existing configuration parameters, the existing configuration parameters being of the first service model, wherein the instructions further cause the one or more processors to store the existing configuration parameters in the one or more memories.

8. The controller of claim 7, wherein the report message is a first report message, and wherein the instructions further cause the one or more processors to:
- receive, from the E2 node, a second report message, the second report message comprising an indication of a change in the existing configuration parameters comprising at least one of a change type of the change or an old value and a new value of at least one changed configuration parameter; and
- update the stored existing configuration parameters based on the indication of the change in the existing configuration parameters.

9. The controller of claim 1, further cause the one or more processors to subscribe to notifications from the E2 node, wherein the notifications comprise at least one or more of periodic notifications or change-based notifications, and wherein the report message is one notification of the notifications and is received based on a subscription to the notifications.

10. The controller of claim 1, wherein the instructions cause the one or more processors to send the control message in response to receiving a user input or an indication of a decision of an application to change one or more configuration parameters of the first object configuration data.

11. An E2 node of a radio access network (RAN), the E2 node comprising:
- one or more processors; and
- one or more memories coupled to the one or more processors, the one or more memories storing instructions to cause the one or more processors to:
  - receive, from a controller of the RAN, a control message of a first service model comprising first object configuration data for a type of object that is a reference attribute for second service model;
  - change a configuration of a cell or a node of the RAN based on the first object configuration data; and
  - send, to the controller, a report message of the first service model comprising second object configuration data.

12. The E2 node of claim 11, wherein the first service model is an open-RAN (O-RAN)-specific service model and the second service model is a non-open RAN (non-O-RAN)-specific service model.

13. The E2 node of claim 11, wherein the first service model comprises an E2 Service Model for Cell Configuration and Control (E2SM-CCC) and the second service model comprises an O1 interface.

14. The E2 node of claim 11, wherein the controller is a Near-Real Time Radio Access Network Intelligent Controller (near-RT RIC).

15. The E2 node of claim 11, wherein the object configuration data comprises an Information Element having data with which the E2 node implements, at a node-level or cell-level, a RIC REPORT service, a RIC INSERT service, a RIC CONTROL service, or a RIC POLICY service for cell configuration and control.

16. The E2 node of claim 11, wherein the instructions further cause the one or more processors to send, to the controller, a control outcome message, in response to the control message, the control outcome message comprising an indication of whether a change in configuration parameters based on the control message was successful.

17. The E2 node of claim 11, wherein the instructions further cause the one or more processors to:

responsive to a trigger, obtain existing configuration parameters of a cell or a node of the RAN according to the first service model; and send, to the controller, the report message, wherein the second object configuration data comprises the existing configuration parameters.

18. The E2 node of claim 17, wherein the report message is a first report message, and wherein the instructions further cause the one or more processors to:

determine a change in the existing configuration parameters of the cell or the node; and send, responsive to a subscription trigger and to the controller, a second notification of indicative of the change in the existing configuration parameters.

19. The E2 node of claim 11, wherein the controller is a first controller configured to operate according to the first service model, and wherein the instructions further cause the one or more processors to send, to a second controller, a report message in accordance with the second service model indicative of the changed configuration.

20. Non-transitory computer-readable storage media comprising instructions, which when executed, cause one or more processors to:

send, to an E2 node of a radio access network (RAN), a control message of a first service model comprising first object configuration data for a type of object that is a reference attribute for a second service model; and receive, from the E2 node, a report message of the first service model comprising second object configuration data.

* * * * *